US012600658B2

(12) United States Patent　　(10) Patent No.:　US 12,600,658 B2
　　Cowles et al.　　　　　　　　　　(45) Date of Patent:　　Apr. 14, 2026

(54) SYSTEM AND METHOD FOR PLATINUM FREE MELTING OF HIGH INDEX GLASSES

(71) Applicant: CORNING INCORPORATED, Corning, NY (US)

(72) Inventors: Curtis Richard Cowles, Corning, NY (US); Patrick Paul Gill, Watkins Glen, NY (US); George Paul Lindberg, Corning, NY (US); Adam Robert Sarafian, Corning, NY (US)

(73) Assignee: Corning Incorporated, Corning, NY (US)

( * ) Notice: Subject to any disclaimer, the term of this patent is extended or adjusted under 35 U.S.C. 154(b) by 93 days.

(21) Appl. No.: 18/659,094

(22) Filed: May 9, 2024

(65)　　　　Prior Publication Data

US 2024/0391815 A1　　Nov. 28, 2024

Related U.S. Application Data

(60) Provisional application No. 63/468,943, filed on May 25, 2023.

(51) Int. Cl.
　　*C03B 5/235*　　　　(2006.01)
　　*C03B 5/193*　　　　(2006.01)
　　　　　　(Continued)

(52) U.S. Cl.
　　CPC ............ *C03B 5/2356* (2013.01); *C03B 5/193* (2013.01); *C03B 5/2353* (2013.01); *F23C 3/004* (2013.01);
　　　　　　(Continued)

(58) Field of Classification Search
　　None
　　See application file for complete search history.

(56)　　　　　　References Cited

U.S. PATENT DOCUMENTS 8,347,655 B2　　1/2013　Leister et al.
8,365,555 B2　　2/2013　Leister et al.
　　　　　　(Continued)

FOREIGN PATENT DOCUMENTS

JP　　　　6431052 B2　　11/2018

OTHER PUBLICATIONS

International Search Report and Written Opinion of the International Searching Authority; PCT/US2024/027199; dated Aug. 13, 2024; 10 pages; European Patent Office.
　　　　　　(Continued)

*Primary Examiner* — Queenie S Dehghan
(74) *Attorney, Agent, or Firm* — Kevin L. Bray

(57)　　　　　　ABSTRACT

A combustion burner employed in a submerged combustion vessel used to melt high index glass includes an arch positioned on a burner in the submerged combustion vessel. An amount of combustible gas flows through a first port disposed in a first haunch of the arch and through a second port disposed in a second haunch of the arch. Fuel is supplied through an end port in a fuel supply line. The end port is disposed under the arch. An amount of glass is fed into the submerged combustion vessel and is melted inside the submerged combustion vessel by igniting the burner. Some of the melted glass at least partially solidifies against a wall of the submerged combustion vessel such that the melted glass is contained in a vessel of itself.

16 Claims, 6 Drawing Sheets

(51) Int. Cl.
| | | |
|---|---|---|
| *F23C 3/00* | (2006.01) | |
| *F23D 14/22* | (2006.01) | |
| *F23D 23/00* | (2006.01) | |
| *F23L 7/00* | (2006.01) | |

(52) U.S. Cl.
CPC ............. *F23D 14/22* (2013.01); *F23D 23/00* (2013.01); *C03B 2211/23* (2013.01); *C03B 2211/60* (2013.01); *F23D 2214/00* (2013.01); *F23L 7/007* (2013.01)

(56) References Cited

U.S. PATENT DOCUMENTS

| | | | | |
|---|---|---|---|---|
| 9,533,905 | B2 | 1/2017 | Charbonneau et al. | |
| 10,183,884 | B2* | 1/2019 | Baker ................... | C03B 5/2353 |
| 11,124,445 | B2 | 9/2021 | Aitken et al. | |
| 11,370,685 | B2 | 6/2022 | Cowles et al. | |
| 11,472,731 | B2 | 10/2022 | Aitken et al. | |
| 11,479,499 | B2 | 10/2022 | Aitken et al. | |
| 11,485,676 | B2 | 11/2022 | Aitken et al. | |
| 11,667,561 | B2 | 6/2023 | Fu et al. | |
| 11,787,729 | B2 | 10/2023 | Luo et al. | |
| 11,802,073 | B2 | 10/2023 | Luo et al. | |
| 11,976,004 | B2 | 5/2024 | Gaspar Marques et al. | |
| 11,999,651 | B2 | 6/2024 | Gaspar Marques et al. | |
| 2006/0088796 | A1* | 4/2006 | Home ................... | F23D 14/105 431/350 |
| 2015/0135775 | A1 | 5/2015 | Charbonneau et al. | |
| 2016/0130168 | A1 | 5/2016 | Cowles et al. | |
| 2017/0074590 | A1 | 3/2017 | Baker et al. | |
| 2021/0009456 | A1 | 1/2021 | Wang et al. | |
| 2022/0306517 | A1 | 9/2022 | Lepicard et al. | |
| 2022/0324744 | A1 | 10/2022 | Gaspar et al. | |
| 2024/0051861 | A1* | 2/2024 | Weil ......................... | C03B 5/44 |

OTHER PUBLICATIONS

Rue et al., "Submerged Combustion Melting of Glass", International Journal of Applied Glass Science, vol. 2, No. 4, 2011, pp. 262-274.

* cited by examiner

100

109

116

106

113

103

119

SYSTEM AND METHOD FOR PLATINUM FREE MELTING OF HIGH INDEX GLASSES

This application claims the benefit of priority under 35 U.S.C § 120 of U.S. Provisional Application Ser. No. 63/468,943 filed on May 25, 2023, the content of which is relied upon and incorporated herein by reference in its entirety.

BACKGROUND

High index glass is beneficial for prescription lenses as well as augmented and virtual reality systems. High index glass compositions can be sensitive to absorption of platinum and other contaminants which impact the quality of the glass. Present methods of melting materials for high-index glass production require performing a double melt of the glass materials, first in quartz and then in platinum at a lower temperature to reduce contamination. This method requires an expensive quartz melter and double melting increases the overall time and cost of producing high index glass.

BRIEF DESCRIPTION OF DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

High index glasses, generally having an index of 1.59 or greater, are used in single-vision, solid bifocal, and progressive prescription requirements as well as in glasses for augmented or virtual reality systems. The higher index of refraction allows for more wavelengths to occupy the same waveguide and more importantly, the higher index can increase the effective field of view for a user. However, the density of an optical material increases with the index of refraction and the corresponding blue light transmission of the optical material decreases with increased density. Therefore, increasing the index of an optical material increases the overall weight of the material while reducing blue transmission. Using base glass compositions with a lower density is one way to combat this issue. However, these compositions can be sensitive to absorption of platinum and other contaminants which impact the quality of the glass. For example, platinum crucibles result in an extremely high absorption coefficient of dissolved platinum in the melt, which causes the glass to have a yellow tint. Similarly, melting in a crucible that is lined with a refractory material can result in dissolved refractory contaminating the melt.

In the following discussion, a general description of the system and its components is provided, followed by a discussion of the operation of the same.

Figure 1:
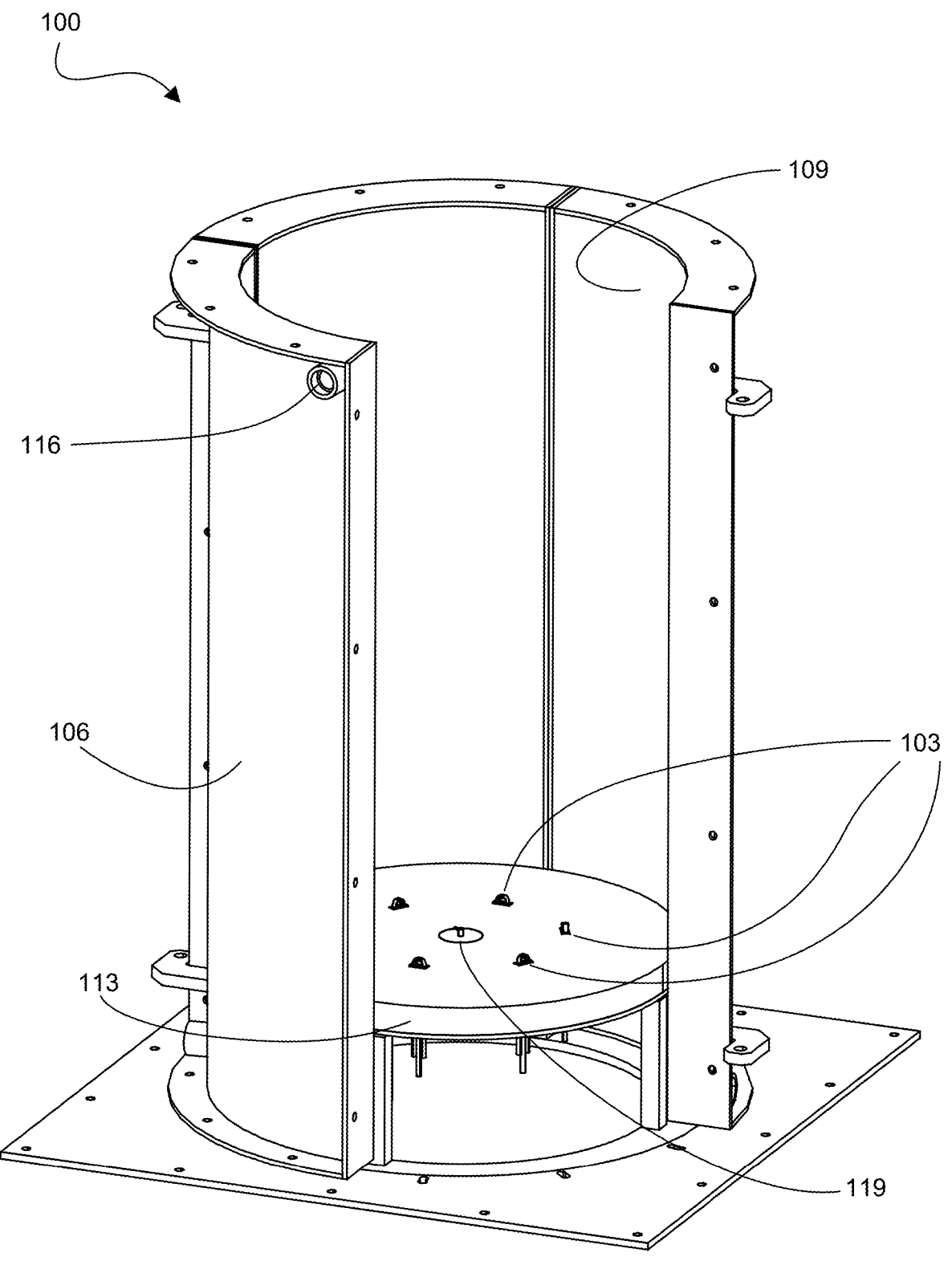
FIG. 1 is a drawing of an example submerged combustion melting vessel according to various embodiments of the present disclosure.

With reference to FIG. 1, a submerged combustion melting (SCM) vessel 100 for melting glass is shown having one or more combustion burners 103 according to various embodiments. While depicted as a cylindrical vessel, the SCM vessel 100 could also be rectangular, cubic, pyramidal, spherical, or any other similar shape as can be appreciated. It is also noted that the SCM vessel 100 depicted in FIG. 1 is open on a top and a front-facing side for the benefit of the viewer and would be a closed container while in operation. Although not show, it is understood that an exhaust system is connected to the top of the SCM vessel 100.

In some embodiments, the one or more combustion burners 103 are arranged in the SCM vessel 100 in a configuration such that the heat produced by the combustion burners 103 is distributed throughout the SCM vessel 100. In some embodiments, the one or more combustion burners 103 are evenly spaced throughout the SCM vessel. In some embodiments, the one or more combustion burners 103 can be arranged in the SCM vessel 100 such that the heat rises from the combustion burners 103 to the rest of the SCM vessel 100. In some embodiments, the combustion burners 103 are arranged in a ring-like configuration, as depicted in FIG. 1. While FIG. 1 depicts a plurality of combustion burners 103, in some embodiments, there is only one combustion burner 103 which is placed in a central location of the SCM vessel 100.

In one embodiment, the SCM vessel 100 includes an outer shell 106 and a refractory 109 lining the interior (walls and floor) of the SCM vessel 100. The refractory 109 may comprise, for example, alumina, silica, magnesium, calcium, chromium, zirconium, or some other material resistant to temperatures exceeding 2000° F. and up to 3000° F.

The one or more combustion burners 103 are partially embedded in the refractory 109 of the SCM vessel 100. In one example, the combustion burners 103 are embedded in a refractory floor 113 of the SCM vessel 100, as depicted in FIG. 1, where refractory floor 113 is lined by refractory 109. In another example, the combustion burners 103 may be embedded in the refractory 109 that lines the walls of the SCM vessel 100.

The SCM vessel 100 is cooled by flowing water through a water port 116 on the outer shell 106. In some embodiments, the water flows between the outer shell 106 and the refractory 109 of the SCM vessel 100. Also, the walls of the SCM vessel 100 may be cooled by flowing a refrigerant, a cool gas, or other cooling medium between the outer shell 106 and the refractory 109. In such an example, the cooling medium flows freely between the outer shell 106 and the refractory 109. In some embodiments, the cooling medium flows through pipes or channels disposed between the outer shell 106 and the refractory 109. By cooling the SMC vessel 100, the refractory 109 is protected from the extreme temperatures of the melted glass. As such, a refractory 109 which has a lower melting point than glass can be used in the SCM vessel 100 without contaminating or otherwise impacting the quality of the melted glass.

The SCM vessel 100 includes a drain 119 for removing melted glass to be formed into a desired structure. In some embodiments, the drain 119 is disposed in the refractory 109 of the SCM vessel 100. In one embodiment, the drain 119 is disposed in the refractory floor 113 of the SCM vessel 100. Alternatively, the drain 119 may be disposed in a wall of the SCM vessel 100. As depicted in FIG. 1, the drain 119 is disposed in a central location relative to the one or more combustion burners 103. In one embodiment, the drain 119 is located opposite an entry port for glass batching materials. The drain 119 is comprised of a material having extreme heat resistance such as platinum or other appropriate material.

Next, a general description of the operation of the various components of the SCM vessel 100 is provided. According to one embodiment, the SCM vessel 100 is used to melt glass to produce optical grade high index glass. An amount of glass material is fed into the SCM vessel 100 in batches to make a titania-niobia-phosphate glass or other type of glass material.

The exposed combustion burners 103 in the SCM vessel 100 are ignited to produce a flame which directly heats and melts the glass materials. While the glass materials are melting, the cooling medium flowing between the outer shell 106 and the refractory 109 cools the walls of the SCM vessel 100. When melted glass contacts the cooled walls, the melted glass partially solidifies at the cooled walls, forming a partially-solid glass crucible around the melted glass. Thus, the melted glass is advantageously contained within a crucible of itself.

This crucible of partially solidified glass protects the refractory 109 from damage due to the extreme temperatures of the melted glass. In addition, the crucible of partially solidified glass prevents chemicals from the refractory 109 from contaminating the melted glass.

As the molten glass is heated directly by the open flame of the combustion burners 103, gas bubbles are formed. These bubbles rise through the melted glass, stirring the melted glass as they rise in a process called fining. Glasses with relatively low viscosity (0.1 Poise to 10 Poise) make the fining process faster. According to one embodiment, the glass melted in the SCM vessel 100 has a low viscosity such that the bubbles will quickly rise through the melted glass resulting in minimum or no trapped bubbles in the glass material. In one embodiment, the viscosity of the glass is less than 200 Poise. In another embodiment, the viscosity of the glass is less than 100 Poise. In still another embodiment, the viscosity of the glass is less than 10 Poise. In yet another embodiment, the viscosity of the glass is less than 5 Poise. In one embodiment, the viscosity of the glass is less than a threshold viscosity at which the glass is self-fining to a degree that results in optical quality. That is to say, the glass is of optical quality and is suitable for use in producing optical quality glass components. This is necessary for some types of glass that require a minimum or no glass bubbles in the ultimate product for which the glass is formed. Once the glass has been fined, the molten glass is drained from the tank through the drain 119 for further processing. In some embodiments, the glass flows through the drain 119 to a finer mounted below the SCM vessel 100.

Figure 2:
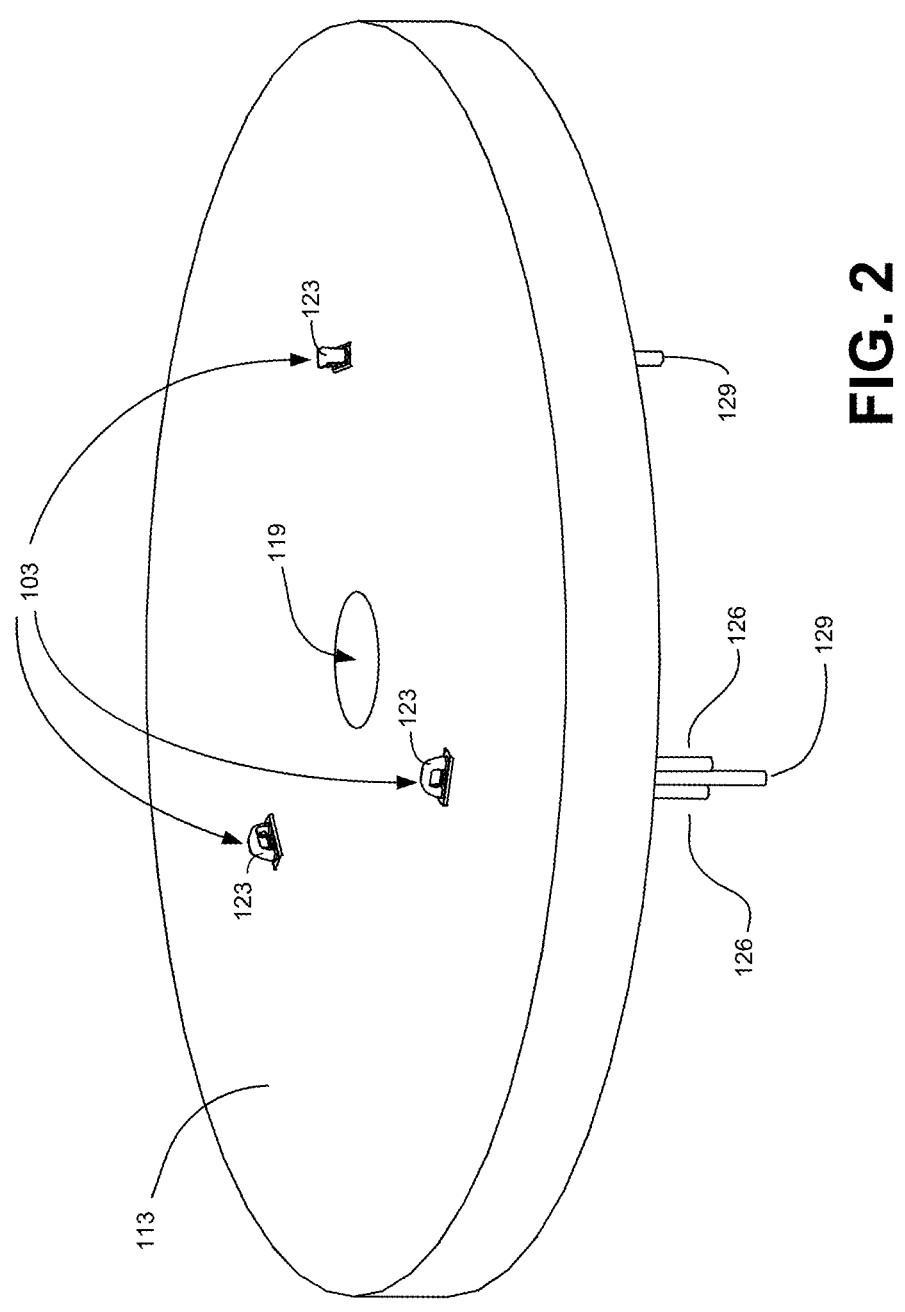
FIG. 2 is an example of a burner configuration in a floor of the submerged combustion melting vessel of FIG. 1 according to various embodiments of the present disclosure.

Moving next to FIG. 2, shown is an example of one configuration of combustion burners 103 in the refractory floor 113 of an SCM vessel 100. In some embodiments, three combustion burners 103 are positioned within the refractory floor 113 although more or fewer combustion burners 103 may be used other than the number depicted. In some embodiments, the drain 119 is disposed in a central location relative to the configuration of combustion burners 103.

The one or more combustion burners 103 are disposed in the refractory floor 113 such that only a portion of each combustion burner 103 is exposed through the refractory floor 113. In some embodiments, the portion of each combustion burner 103 that is exposed through the refractory floor 113 includes an arch 123. In one example, the arch 123 is made of a material having extreme heat resistance such as platinum or other appropriate material. In some embodiments, the arch 123 connects the terminating ends of two or more supply lines 126.

The supply lines 126 of a respective combustion burner 103 are disposed on an exterior side of the refractory floor 113 and extend through a body (not shown) of the combustion burner 103 and through the refractory floor 113 to form the arch 123. In FIG. 2, the supply lines 126 are shown extending below the refractory floor 113. In some embodiments, a fuel supply line 129 is disposed under the arch 123 between the supply lines 126. While the supply lines 126 and fuel supply lines 129 of FIG. 2 are shown having terminating ends below the refractory floor 113, it is understood that the supply lines 126 and fuel supply lines 129 are connected to respective supply sources located outside the SCM vessel 100. According to various embodiments, the supply lines 126 and the fuel supply lines 129 are made of platinum, steel, copper, aluminum, stainless steel, nickel, or some other material. The arch 123, the supply lines 126, and the fuel supply line 129 are discussed in further detail in the description of FIGS. 5A, 5B, 6A, and 6B.

Figure 3:
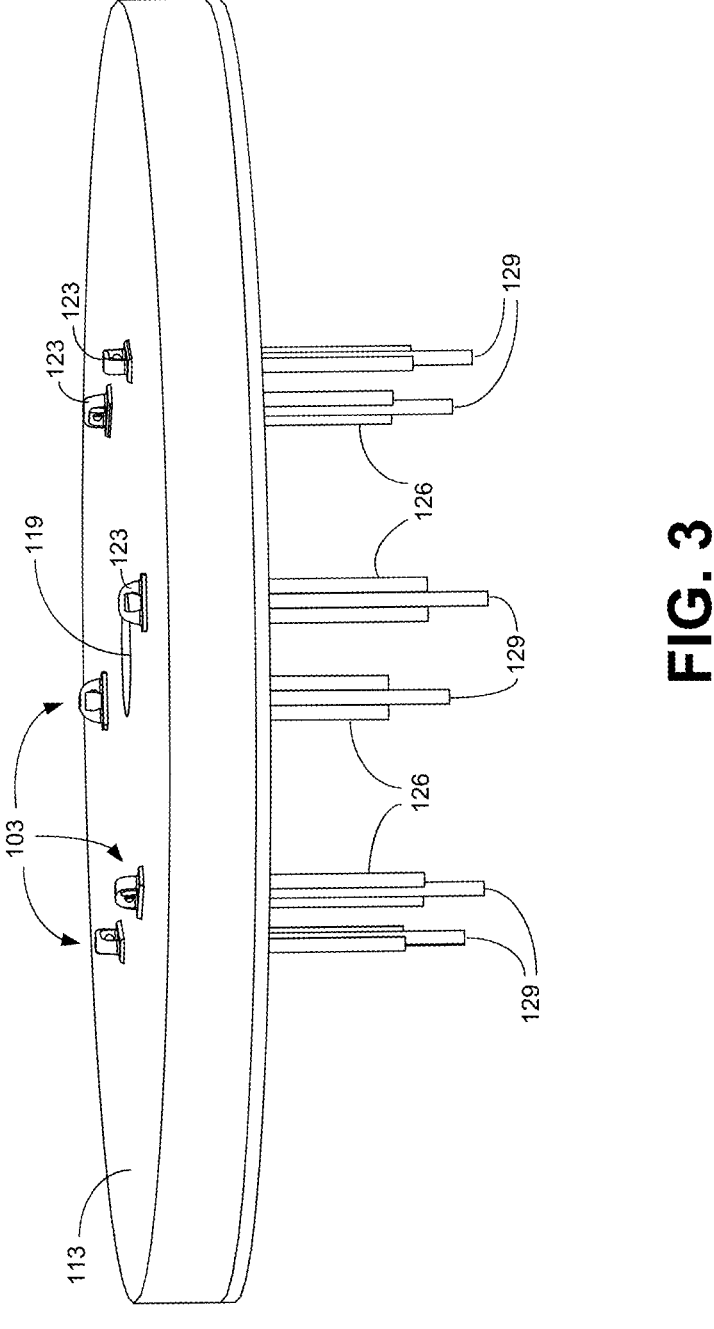
FIG. 3 is an example of a burner configuration in a floor of the submerged combustion melting vessel of FIG. 1 according to various embodiments of the present disclosure.

Referring next to FIG. 3, shown is an example configuration of combustion burners 103 disposed in a refractory floor 113 of an SCM vessel 100. In one embodiment, six combustion burners 103 are disposed around the refractory floor 113. Each of the combustion burners 103 comprises one or more supply lines 126, where the supply lines 126 provide oxygen to the combustion burners 103. Each of the combustion burners 103 comprises one or more fuel supply lines 129. The fuel supply lines 129 provide fuel to the combustion burners 103. In some embodiments, the fuel supply lines 129 provide a combustible gas (e.g., hydrogen, methane, propane, butane, ethylene, isobutane, natural gas, etc.) to the combustion burners 103. While the supply lines 126 and fuel supply lines 129 of FIG. 3 are shown with terminating ends below the refractory floor 113, it is understood that the supply lines 126 and fuel supply lines 129 are connected to respective supply sources located outside the SCM vessel 100.

According to one embodiment, the drain 119 is disposed in the refractory floor 113 among the combustion burners 103 and comprises a refractory-lined port. In some embodiments, the drain 119 comprises a channel of a material having extreme heat resistance. Appropriate cooling may be provided to the walls of the drain 119 such that the molten glass material may at least partially solidify against the walls of the drain 119. As such, the molten glass material is protected from contamination by the refractory materials that make up the drain 119. The drain 119 provides a pathway for the melted glass to exit the SCM vessel 100 for further processing.

Figure 4:
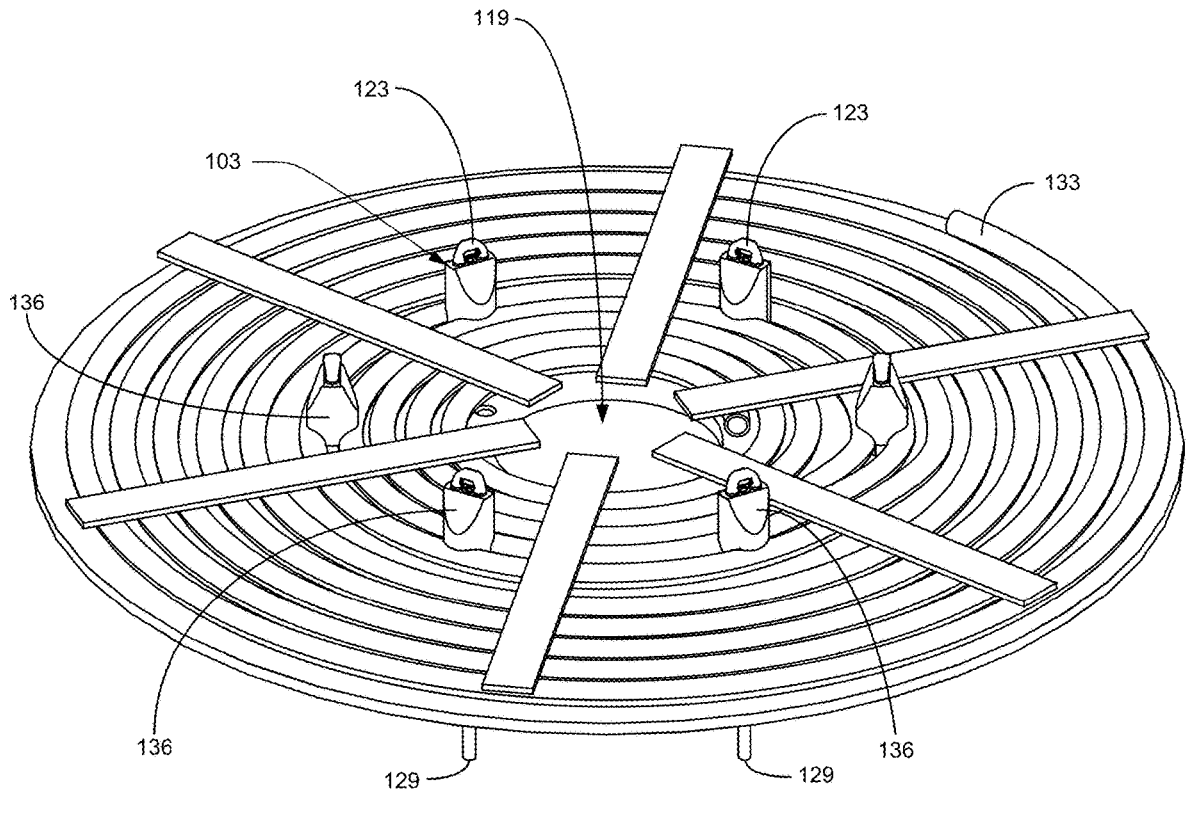
FIG. 4 is an example of a burner configuration and cooling element of the submerged combustion melting vessel of FIG. 1 according to various embodiments of the present disclosure.

Moving on to FIG. 4, shown is an example configuration of combustion burners 103 and a cooling element 133 in an SCM vessel 100. In some embodiments, individual combustion burners 103 include an arch 123 connecting a first supply line 126 to a second supply line 126, and a fuel supply line 129 disposed below the arch 123. Individual ones of the combustion burners 103 also include a body 136.

In one embodiment, the body 136 is made of copper. Alternatively, the body 136 may be constructed from other materials with a high degree of heat conductivity such as aluminum, silver, platinum, nickel, or other heat conducting material as can be appreciated. In one embodiment, the body 136 encases at least a portion of the supply lines 126 and the fuel supply line 129. The supply lines 126 extend beyond a top surface 139 of the body 136 to form the arch 123. In one embodiment, the body 136 is in contact with the cooling element 133.

The cooling element 133 of FIG. 4 is depicted as a coiled pipe through which a cooling medium flows. In one embodiment, the cooling element 133 is a single coil of pipe. The cooling element 133 is made of a heat conductive material such as copper, aluminum, silver, or another heat conductive material as can be appreciated. The cooling element 133 provides for a reservoir of cooling medium and the body 136, supply lines 126, and fuel supply line 129 are positioned near the cooling element 133. In some embodiments, the cooling medium in the cooling element 133 is water, a refrigerant, a cool gas, or other cooling medium as can be appreciated.

Figure 5A:
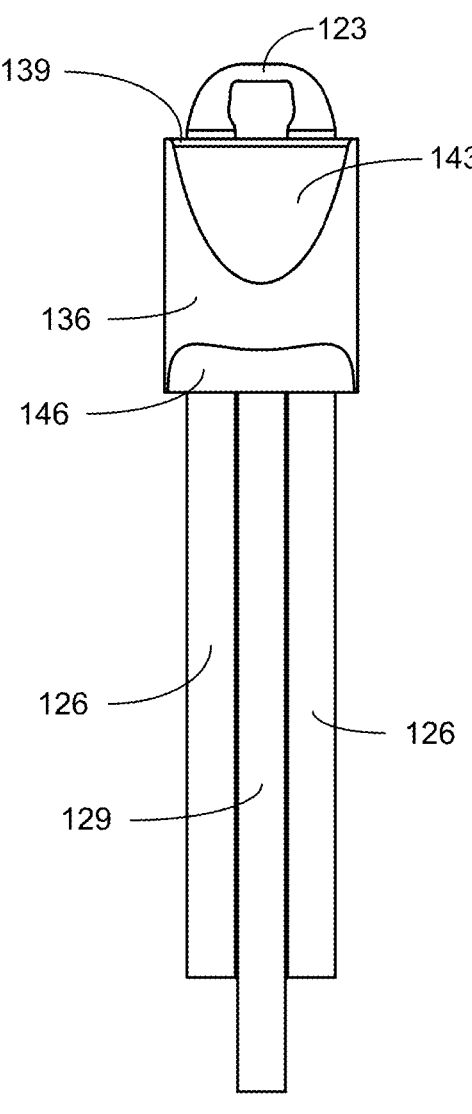
FIG. 5A is an example front view of a burner of the submerged combustion melting vessel of FIG. 1 according to various embodiments of the present disclosure.
Figure 5B:
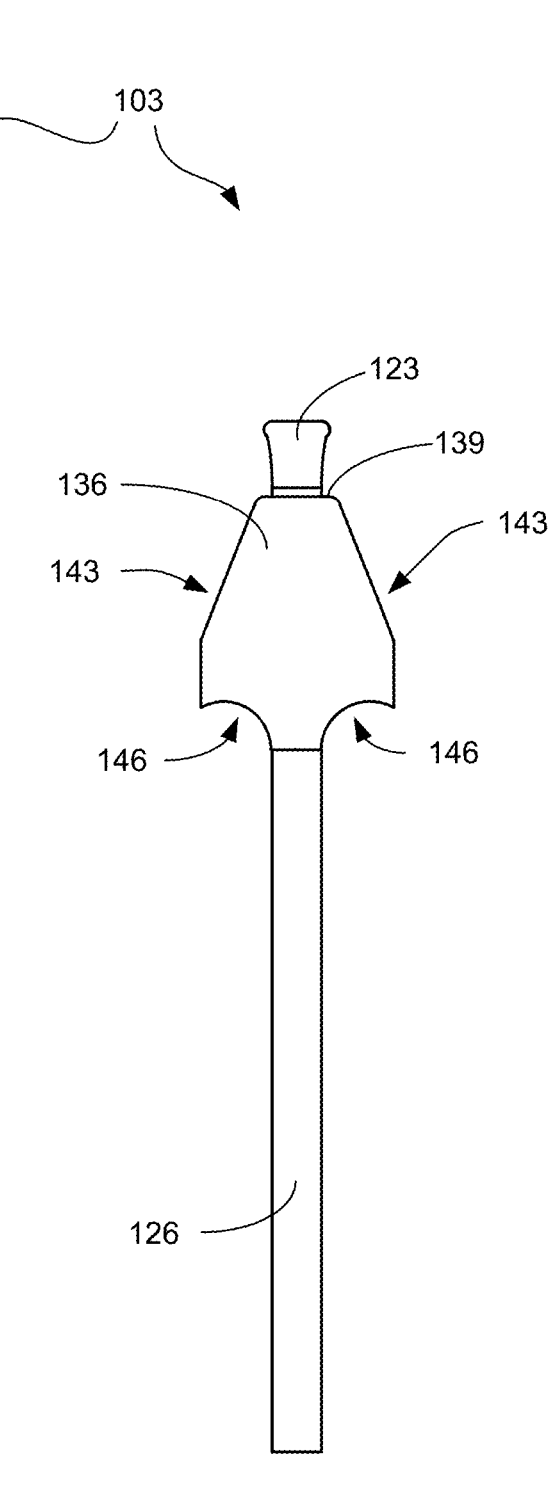
FIG. 5B is an example side view of a burner of the submerged combustion melting vessel of FIG. 1 according to various embodiments of the present disclosure.

Turning next to FIGS. 5A and 5B, shown are different views of an example of a combustion burner 103 according to one embodiment. FIG. 5A is an example front view of a combustion burner 103. FIG. 5B is an example side view of the combustion burner 103. In the views of FIGS. 5A and 5B, the combustion burner 103 has a fuel supply line 129 disposed between two supply lines 126. In one embodiment, the body 136 of the combustion burner 103 encases an upper portion of the supply lines 126 and the fuel supply line 129, with a top surface 139 of the body 136 at least partially exposed through the refractory 109 (lining the walls or refractory floor 113 of SCM 100) along with the arch 123. In one embodiment, approximately ¾ of an inch of the body 136 protrudes through the refractory 109, although the actual portion of the body 136 that protrudes through the refractory 109 may vary. In another embodiment, the portion of the body 136 that protrudes above the refractory 109 and is visible is just enough to ensure that the refractory 109 does not affect the operation of the combustion burner 103 or such that any effect of the refractory 109 on the operation of the combustion burner 103 is minimized. In this respect, the refractory 109 might be subjected to heat from the flame of a combustion burner 103 that would degrade the integrity of the refractory 109 and possibly cause the contamination of the glass material from the refractory 109 if the flame of the combustion burner 103 is too close to the refractory 109.

In FIGS. 5A and 5B, the body 136 of the combustion burner 103 has a beveled portion 143 extending from the top surface 139 down toward a distal end of the body 136. This beveled portion 143 of the body 136 reduces the surface area of the top surface 139, which, in some embodiments, is exposed to the molten glass material through the refractory 109. In some embodiments, the body 136 includes a beveled portion 143 on a front and a back of the body 136. In some embodiments, the body 136 has a beveled portion 143 on all sides, forming a cone-like shape, with the narrower end at the top surface 139. In some embodiments, the beveled portion 143 extends from the top surface 139 down to the bottom of the body 136. In some embodiments, the beveled portion 143 extends only along a part of the body 136. In some embodiments, the beveled portion 143 forms a 225° or greater angle with the top surface 139.

FIGS. 5A and 5B show one or more fillets 146 disposed at the bottom of the body 136. For example, the body 136 may have at least one fillet 146 disposed at a distal end from the top surface 139. In one embodiment, the body 136 has a fillet 146 on one or both sides. In another embodiment, the fillet 146 is continuous around a bottom perimeter of the body 136. According to one aspect, each fillet 146 is designed to fit the shape of the cooling element 133 so as to maximizes surface to surface contact or surface area contact between the body 136 and the cooling element 133. In some embodiments, an inner radius of the fillet 146 corresponds to an outer radius of the cooling element 133.

The surface area contact between the body 136 and the cooling element 133 promotes the conduction of heat from the body 136 to the cooling element 133. This allows the body 136 to maintain a cooler temperature as compared to a scenario where the body 136 does not come into contact with the cooling element 133. In one embodiment, the fillet 146 is shaped so that the wall of the fillet 146 stays in contact with the curved pipe that makes up the cooling element 133. In an alternative embodiment, the cooling element 133 may comprise straight lengths of pipe, where an inner contour of the fillet 146 would contact such straight lengths of pipe.

In addition, to provide further cooling to the body 136 of the combustion burner 103, the combustible gas and fuel flowing through the supply lines 126 and the fuel supply line 129, respectively, can serve to remove heat from the body 136. To this end, to the extent that the temperature of the fuel or combustible gas flowing through the supply lines 126 and the fuel supply line 129 is less than the temperature of the combustion burner 103, a cooling of the combustion burner 103 will result. In one embodiment, the combustible gas and fuel flowing through the supply lines 126 and the fuel supply line 129 may be chilled to provide for further cooling, although the temperature of the combustible gas and fuel flowing through the supply lines 126 and the fuel supply line 129 cannot be set at a point where the effectiveness of the combustion is compromised.

Figure 6A:
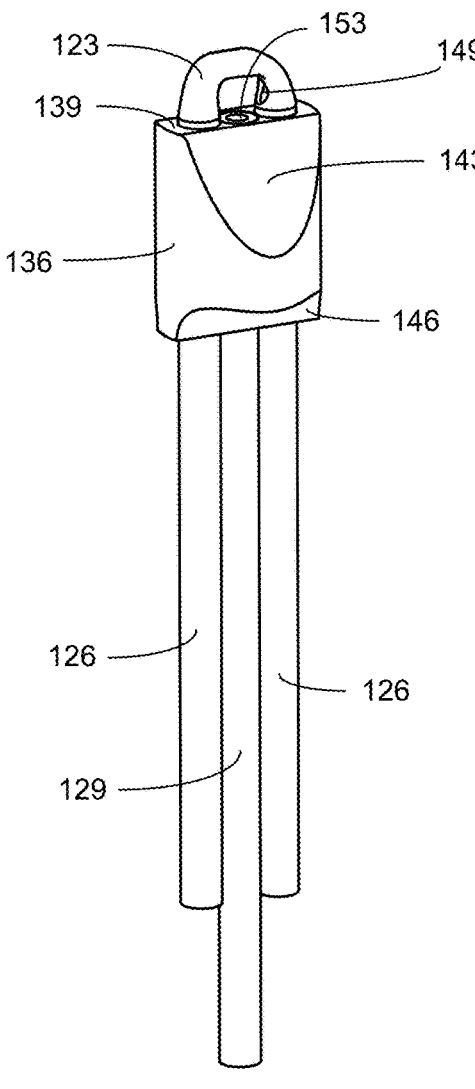
FIG. 6A is an example perspective view of a burner of the submerged combustion melting vessel of FIG. 1 according to various embodiments of the present disclosure.

Moving on to FIG. 6, shown are example perspective views of a combustion burner 103. In FIG. 6A, the supply lines 126 and the fuel supply line 129 are partially encased by the body 136. The supply lines 126 extend through the body 136 before turning and meeting to form the arch 123. In one embodiment, the terminating ends of the supply lines 126 meet to form the arch 123. In some embodiments, the arch 123 is made of platinum while the supply lines 126 are made of another material such as copper, steel, or other material.

The arch 123 is fused to the supply lines 126 at the top surface 139 of the body 136. Alternatively, the arch 123 and the supply lines 126 may be formed from a single length of pipe that is bent at a point to form the arch 123. In one embodiment, the arch 123 is formed in a semi-circular shape. Alternatively, the arch 123 may be formed in a semi-elliptical shape, a square shape, a horse-shoe shape, or any other similar arched configuration as can be appreciated. In FIGS. 5 and 6, the arch 123 is formed in a square shape with rounded corners. The arch 123 may be hollow throughout allowing for combustible gas supplied through the supply lines 126 to flow through the arch. In other embodiments, at least a portion of the arch 123 is solid, or otherwise sealed, between the supply line 126 of one haunch and the supply line 126 of the other haunch.

Figure 6B:
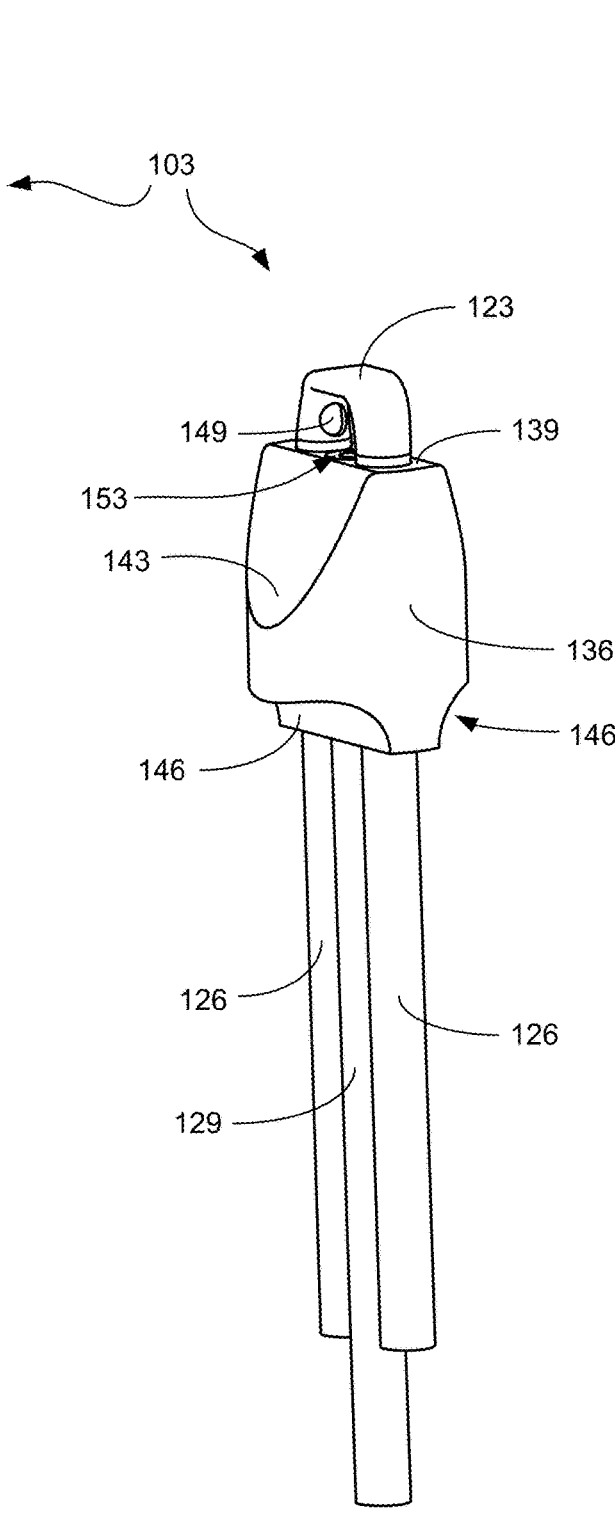
FIG. 6B is an example perspective view of a burner of the submerged combustion melting vessel of FIG. 1 according to various embodiments of the present disclosure.

Shown in FIG. 6B, the arch 123 includes at least one port 149. The arch 123 includes a first port 149 in a first haunch and a second port 149 in a second haunch. In one embodiment, the first port 149 faces the second port 149. The supply lines 126 provide an amount of combustible gas through each port 149. The ports 149 are disposed in the haunches of the arch 123 above the top surface 139 of the body 136.

In some embodiments, a terminating end of the fuel supply line 129 forms an end port 153 at the top surface 139 of the body 136. Fuel from the fuel supply line 129 exits through the end port 153 which, in some embodiments, faces the underside of the arch 123. The end port 153 of the fuel supply line 129 may be positioned flush with the top surface 139 of the body 136. The end port 153 of the fuel supply line 129 is exposed through the refractory 109.

The fuel exiting the end port 153 and the combustible gas exiting the at least one port 149 of the supply lines 126 meet at the center of the arch 123 and produce a point of zero momentum. In at least this embodiment, a flame produced by igniting the fuel and combustible gas mixture is anchored at the point of zero momentum and shielded from the pressure of the melted glass by the arch 123. In addition, the combustion of the gas mixture creates a protective bubble at least under the arch 123 that minimizes the amount of melted glass material that comes into contact with the top surface 139 of the body 136 and the inside of the arch 123. This minimizes an amount of material of the body 136 and the top surface 139 that might leave the surfaces thereof and contaminate the glass mixture.

With reference to FIGS. 1 through 6, in view of the foregoing discussion, below is a description of the various embodiments of the present disclosure. It is understood that the below embodiments are not an exhaustive recitation of the possible embodiments of the present disclosure and that other embodiments are described herein.

Embodiment 1 is a combustion burner for a submerged combustion melting vessel. The combustion burner comprises an arch and a first port disposed in a first haunch of the arch. A second port is disposed in a second haunch of the arch. A fuel supply line terminates into an end port, where the end port is disposed under the arch.

Embodiment 2 is the combustion burner of embodiment 1, wherein the first port faces the second port.

Embodiment 3 is an apparatus, comprising a vessel, a refractory on an interior of the vessel and a plurality of combustion burners disposed in the vessel and being partially exposed through the refractory. Individual ones of the combustion burners comprise an arch, a first port disposed in a first haunch of the arch, a second port disposed in a second haunch of the arch, and a fuel supply line terminating into an end port disposed under the arch.

Embodiment 4 comprises an apparatus as set forth in embodiment 3, wherein the first port faces the second port.

Embodiment 5 comprises an apparatus as set forth in embodiments 3 or 4, wherein an amount of fuel is provided to the combustion burner through the fuel supply line and exits the fuel supply line through the end port.

Embodiment 6 comprises an apparatus as set forth in embodiments 3 through 5, wherein the arch is formed between a terminating end of a first supply line and a terminating end of a second supply line. The first and second supply lines provide an amount of oxygen gas to the first and second ports respectively.

Embodiment 7 comprises an apparatus as set forth in embodiments 3 through 6, wherein individual ones of the combustion burners further comprise a body encasing a least a portion of the first supply line and at least a portion of the second supply line. The arch, the first port, and the second port extend from a first surface the body.

Embodiment 8 comprises an apparatus as set forth in embodiment 7, wherein the refractory covers at least a portion of the body.

Embodiment 9 comprises an apparatus as set forth in embodiments 7 or 8 further comprising a cooling pipe disposed below the floor of the refractory and contacting the body of individual ones of the combustion burners.

Embodiment 10 comprises an apparatus as set forth in embodiment 9, wherein the body comprises a fillet at a distal end and the fillet has a radius which corresponds to a radius of the cooling pipe.

Embodiment 11 comprises an apparatus as set forth in embodiments 3 through 10, further comprising a glass in the vessel, the glass having a viscosity in liquid form of less than or equal to a viscosity threshold of at least 10 Poise.

Embodiment 12 comprises an apparatus as set forth in embodiment 11, wherein an amount of the glass forms a layer of at least partially solidified glass against the refractory of the vessel.

Embodiment 13 is a method of melting glass, comprising positioning an arch on a burner in a submerged combustion vessel and supplying oxygen through a first port disposed in a first haunch of the arch and through a second port disposed in a second haunch of the arch. The method further comprises supplying fuel through an end port in a fuel supply line, the end port being disposed under the arch, feeding an amount of glass into the submerged combustion vessel, and melting the amount of glass inside the submerged combustion vessel by igniting the burner.

Embodiment 14 comprises a method as set forth in embodiment 13, further comprising draining the melted glass through a drain disposed in the submerged combustion vessel.

Embodiment 15 comprises a method as set forth in embodiments 13 or 14, further comprising flowing water between an exterior shell of the submerged combustion vessel and a refractory lining of the submerged combustion vessel.

Embodiment 16 comprises a method as set forth in embodiment 15 further comprising partially solidifying at least a portion of the melted glass against the refractory lining of the submerged combustion vessel.

Embodiment 17 is a burner disposed in a submerged combustion vessel, the burner comprising an arch, a first port disposed in a first haunch of the arch, and a second port disposed in a second haunch of the arch. The burner further comprises a fuel supply line terminating into an end port disposed under the arch, and a body encasing a least a portion of the first haunch of the arch and at least a portion of the second haunch of the arch. The arch, the first port, and the second port extend from a first surface of the body.

Embodiment 18 comprises the burner of embodiment 17, wherein the first port faces the second port.

Embodiment 19 comprises the burner of embodiments 17 or 18, wherein an amount of fuel is provided to the burner through the fuel supply line and exits the fuel supply line through the end port.

Embodiment 20 comprises the burner of embodiments 17 through 19, wherein the arch is formed between a terminating end of a first supply line and a terminating end of a second supply line, the first and second supply lines providing an amount of oxygen gas to the first and second ports respectively.

Embodiment 21 comprises the burner of embodiments 17 through 20, wherein the body further comprises a fillet at a distal end, the fillet having a radius which corresponds to a radius of a cooling conduit.

Embodiment 22 comprises the burner of embodiments 17 through 21, wherein the body further comprises a beveled portion extending from the first surface toward the distal end.

Embodiment 23 comprises an apparatus as set forth in embodiments 3 through 10, further comprising a glass in the vessel, the glass having a viscosity that is less than a threshold viscosity at which the glass is self-fining to a degree that results in optical quality.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. An apparatus, comprising:
a vessel;
a refractory on an interior of the vessel; and
a plurality of combustion burners disposed in the vessel and being partially exposed through the refractory, individual ones of the combustion burners comprising:
an arch;
a first port disposed in a first haunch of the arch;
a second port disposed in a second haunch of the arch; and
a fuel supply line terminating into an end port, the end port being disposed under the arch.

2. The apparatus of claim 1, wherein the first port faces the second port.

3. The apparatus of claim 1, wherein the arch is formed between a terminating end of a first supply line and a terminating end of a second supply line, the first and second supply lines providing an amount of oxygen gas to the first and second ports respectively.

4. The apparatus of claim 3, wherein individual ones of the combustion burners further comprise a body encasing a least a portion of the first supply line and at least a portion of the second supply line, wherein the arch, the first port, and the second port extend from a first surface of the body.

5. The apparatus of claim 4, wherein the refractory covers at least a portion of the body.

6. The apparatus of claim 4, further comprising a cooling pipe disposed below a floor of the refractory and contacting the body of individual ones of the combustion burners.

7. The apparatus of claim 6, wherein the body comprises a fillet at a distal end, the fillet having a radius which corresponds to a radius of the cooling pipe.

8. The apparatus of claim 1, further comprising a glass in the vessel, the glass having a viscosity in liquid form of less than or equal to a viscosity threshold of 10 Poise.

9. The apparatus of claim 8, wherein an amount of the glass forms a layer of at least partially solidified glass against the refractory of the vessel.

10. The apparatus of claim 1, further comprising a glass in the vessel, the glass having a viscosity that is less than a threshold viscosity at which the glass is self-fining to a degree that results in optical quality.

11. A burner disposed in a submerged combustion vessel, the burner comprising:
an arch;
a first port disposed in a first haunch of the arch;
a second port disposed in a second haunch of the arch;
a fuel supply line terminating into an end port, the end port being disposed under the arch; and
a body encasing a least a portion of the first haunch of the arch and at least a portion of the second haunch of the arch, wherein the arch, the first port, and the second port extend from a first surface of the body.

12. The burner of claim 11, wherein the first port faces the second port.

13. The burner of claim 11, wherein the arch is formed between a terminating end of a first supply line and a terminating end of a second supply line, the first and second supply lines providing an amount of oxygen gas to the first and second ports respectively.

14. The burner of claim 11, wherein the body further comprises a fillet at a distal end, the fillet having a radius which corresponds to a radius of a cooling conduit.

15. The burner of claim 14, wherein the body further comprises a beveled portion extending from the first surface toward the distal end.

16. The burner of claim 11, wherein an amount of fuel is provided to the burner through the fuel supply line and exits the fuel supply line through the end port.

* * * * *